United States Patent [19]
Nakatsuji

[11] Patent Number: 5,606,459
[45] Date of Patent: Feb. 25, 1997

[54] HIGH MAGNIFICATION ZOOM LENS

[75] Inventor: Masahiro Nakatsuji, Hokkai-dou, Japan

[73] Assignee: Nikon Corporation, Tokyo, Japan

[21] Appl. No.: 490,157

[22] Filed: Jun. 14, 1995

[30] Foreign Application Priority Data

Aug. 30, 1994 [JP] Japan .................................. 6-228820

[51] Int. Cl.$^6$ ..................................................... G02B 15/14
[52] U.S. Cl. ........................................... 359/683; 359/688
[58] Field of Search .................................. 359/683, 684, 359/685, 686, 688

[56] References Cited

U.S. PATENT DOCUMENTS

| 5,325,233 | 6/1994 | Nakatsuji et al. . | |
|---|---|---|---|
| 5,442,485 | 8/1995 | Yamanashi | 359/683 |

FOREIGN PATENT DOCUMENTS

| 0592916A1 | 4/1994 | European Pat. Off. . |
| 5-224123 | 9/1993 | Japan . |
| 5-273467 | 10/1993 | Japan . |
| 6-34885 | 2/1994 | Japan . |
| 6-123836 | 5/1994 | Japan . |
| 6-130330 | 5/1994 | Japan . |

Primary Examiner—Scott J. Sugarman
Attorney, Agent, or Firm—Oliff & Berridge

[57] ABSTRACT

A high-magnification zoom lens having a lens system that is movable from a wide angle setting to a telephoto setting includes five lens groups. The lens system has a focal length of fW in the wide angle setting and a focal length of fT in the telephoto setting. The five lens groups are arranged in order from an object side along an optical axis that extends from a center of the lens system. A first lens group G1 has a positive refractive power and a focal length of f1, a second lens group G2 has a negative refractive power and a focal length of f2, a third lens group G3 has a negative refractive power and a focal length of f3, a fourth lens group G4 has a positive refractive power, and an image composing lens group GR has a positive refractive power. When the lens system changes from the wide angle setting to the telephoto setting, the first lens group G1 and the fourth lens group G4 move such that a distance between the first lens group G1 and the second lens group G2 increases, a distance between the third lens group G3 and the fourth lens group G4 decreases, and several conditions are satisfied.

30 Claims, 12 Drawing Sheets

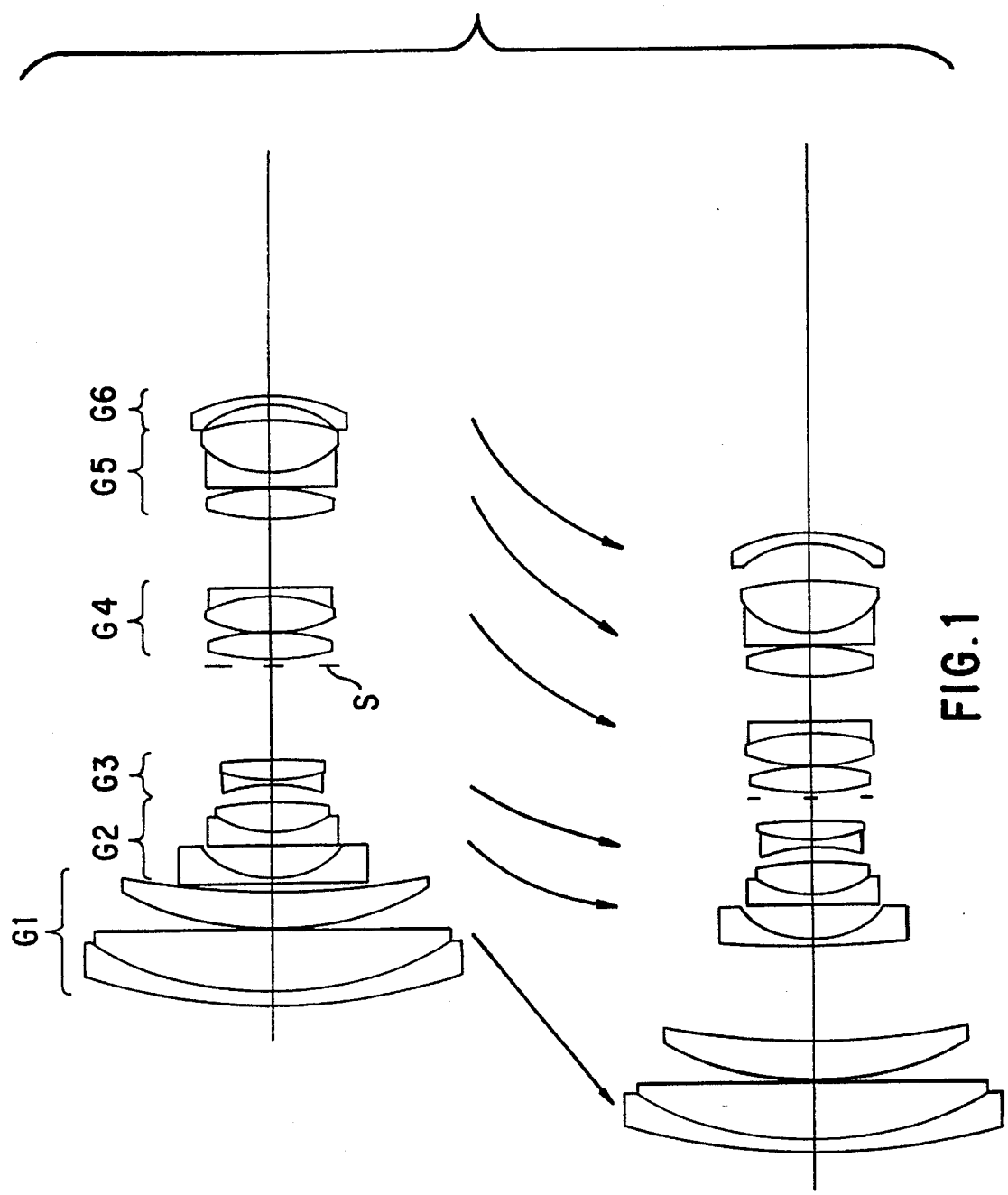

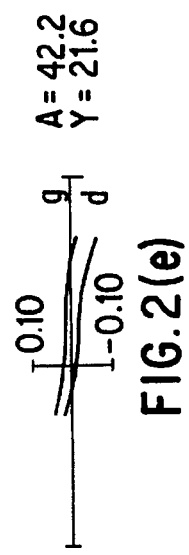
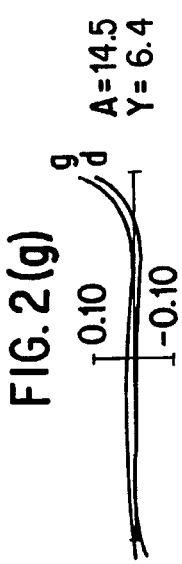
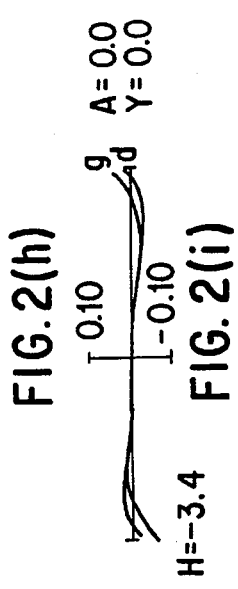
FIG. 2(e)  A=42.2  Y=21.6
FIG. 2(f)  A=34.8  Y=16.5
FIG. 2(g)  A=27.1  Y=12.3
FIG. 2(h)  A=14.5  Y=6.4
FIG. 2(i)  A=0.0  Y=0.0  H=-3.4
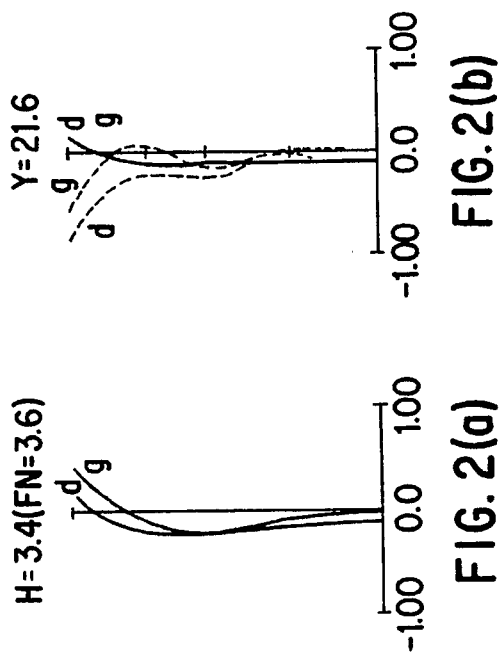
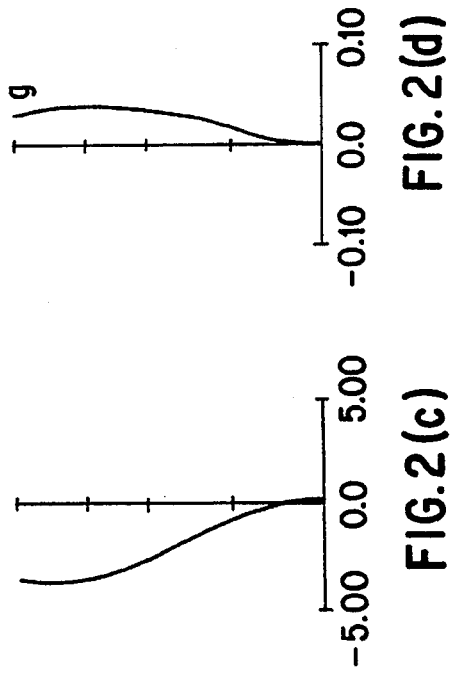
FIG. 2(a)  H=3.4 (FN=3.6)
FIG. 2(b)  Y=21.6
FIG. 2(c)
FIG. 2(d)

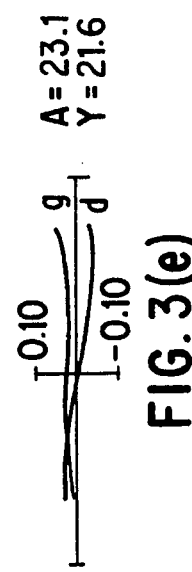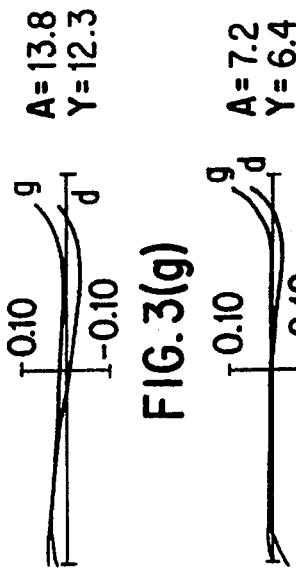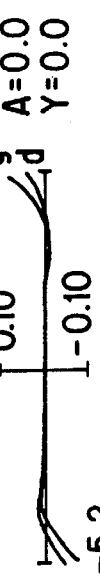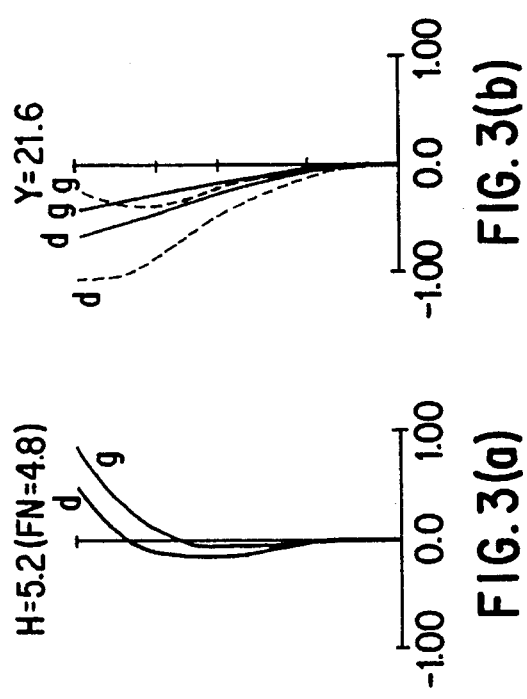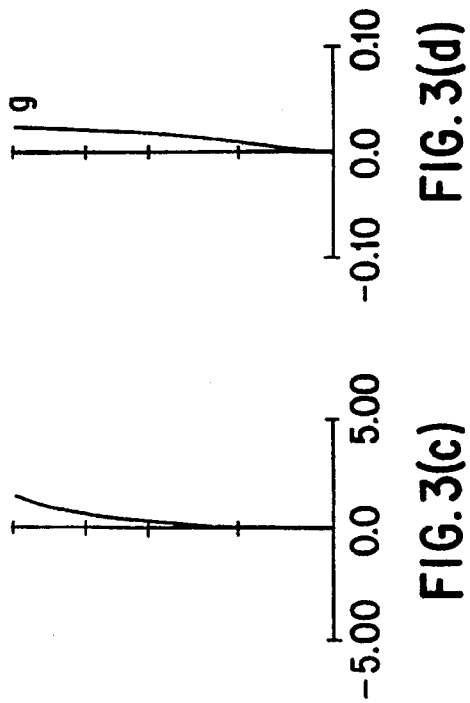

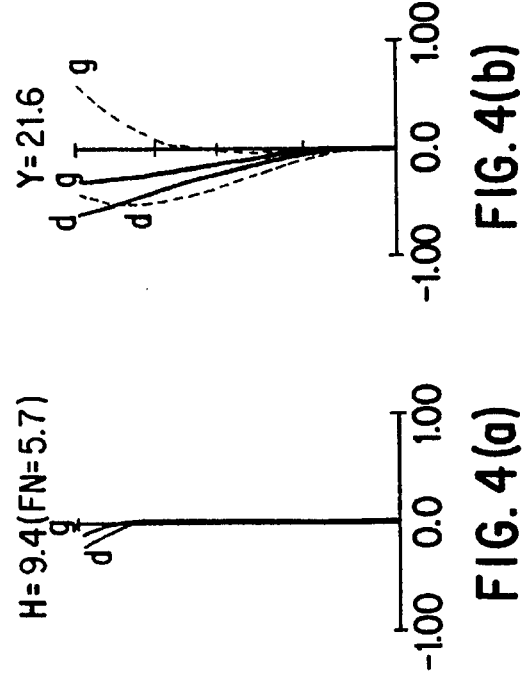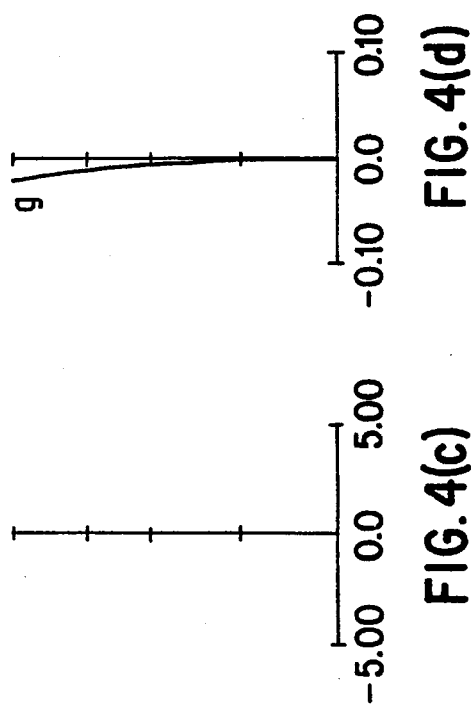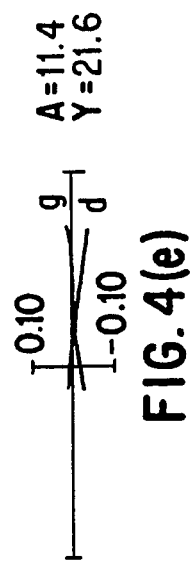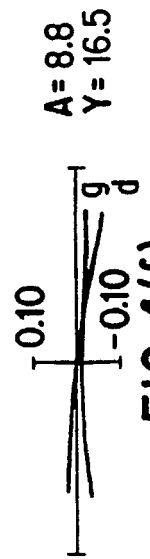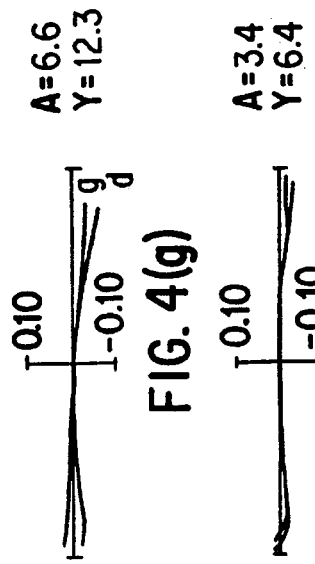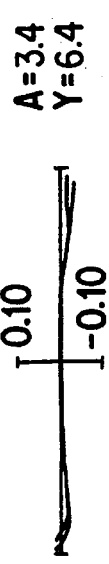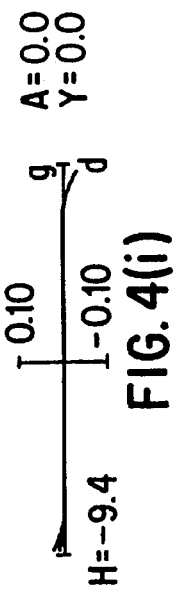

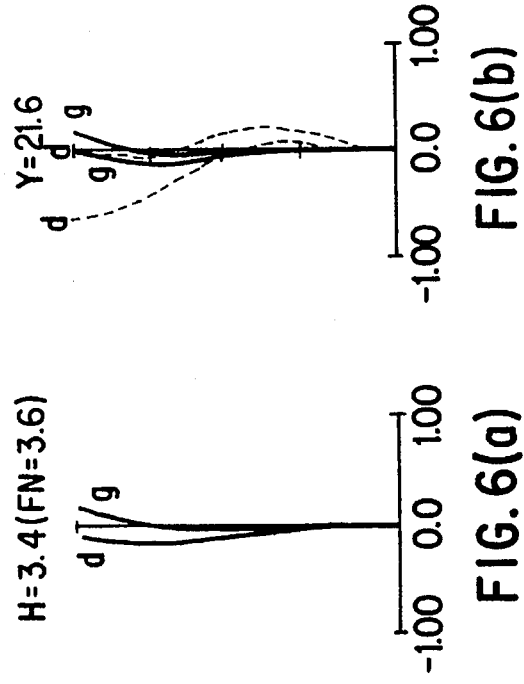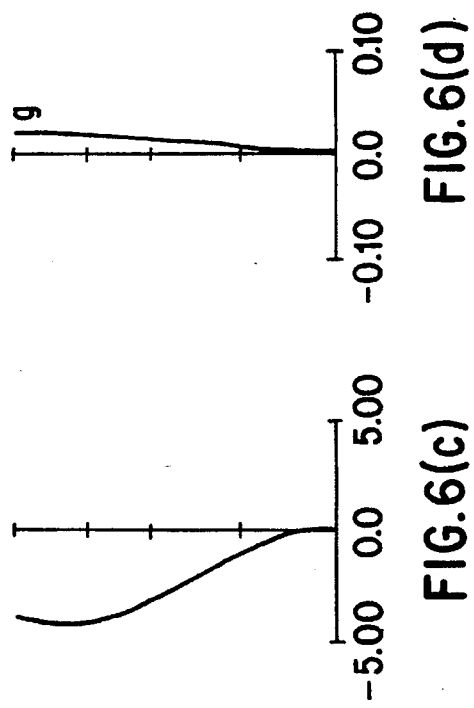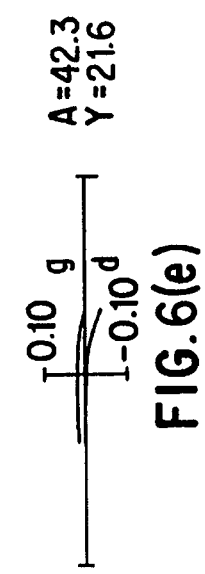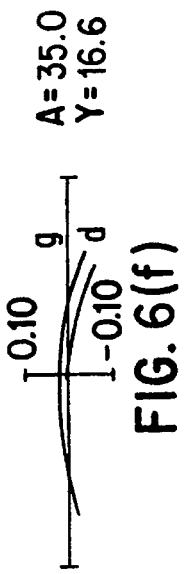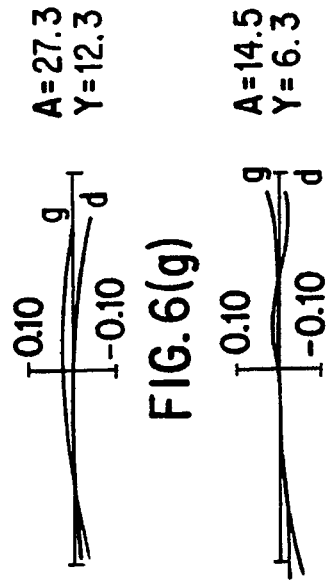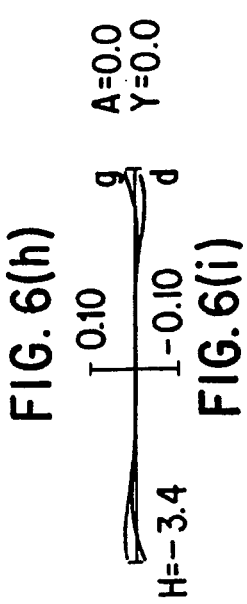

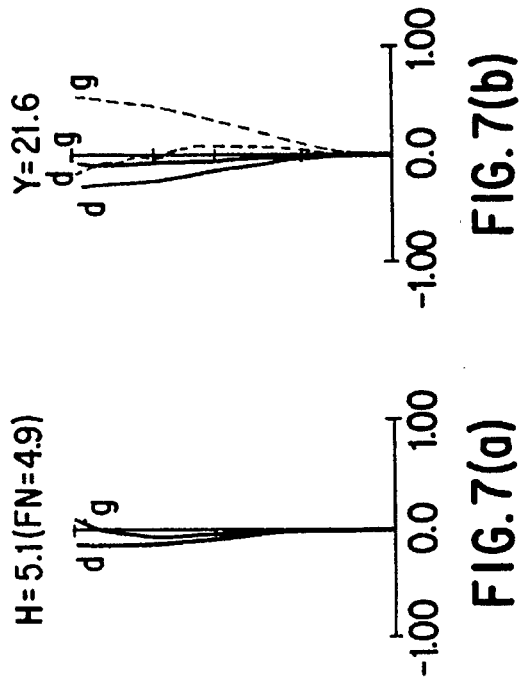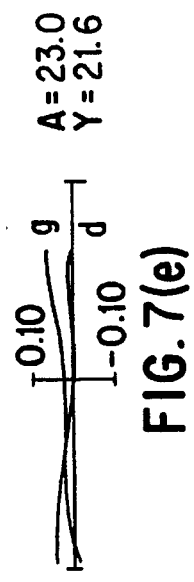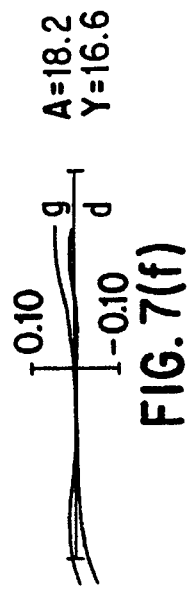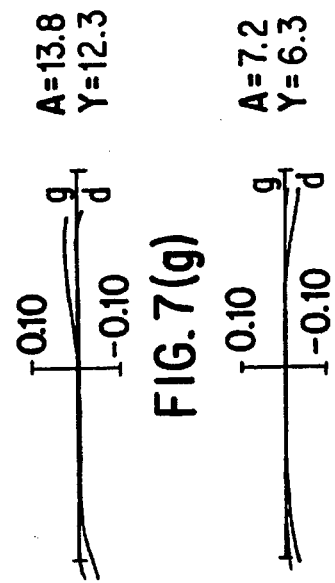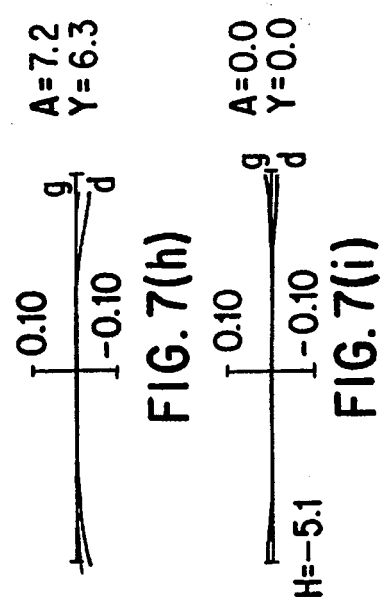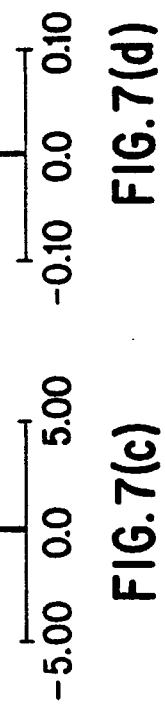

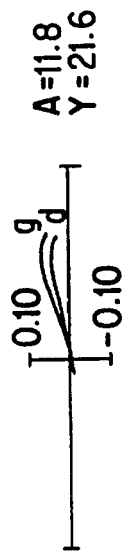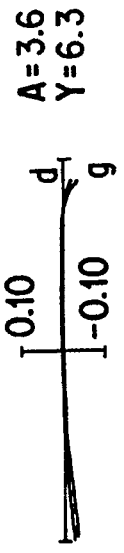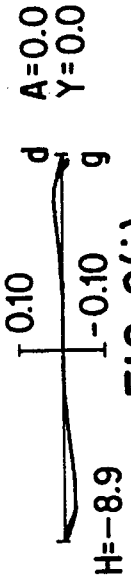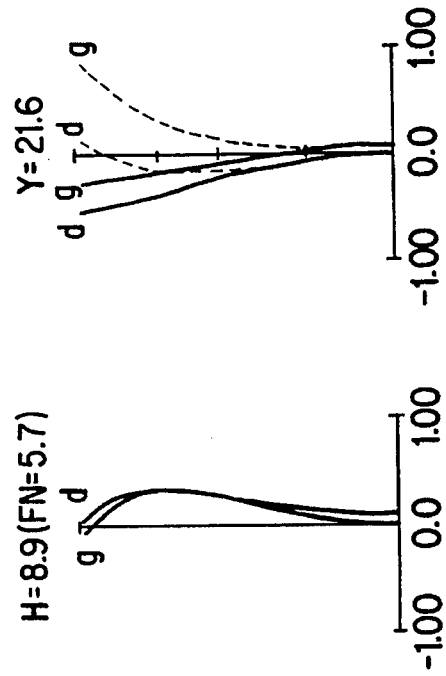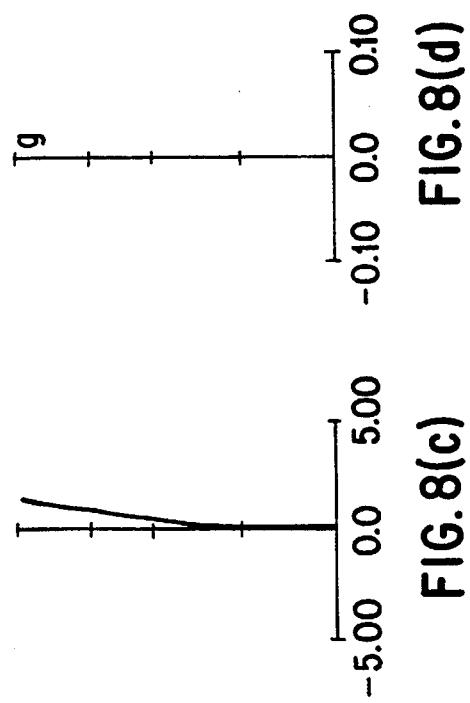

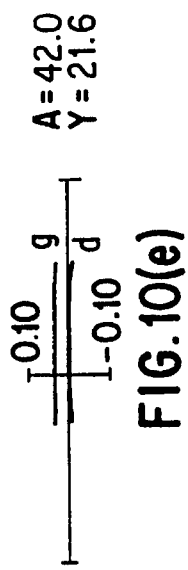
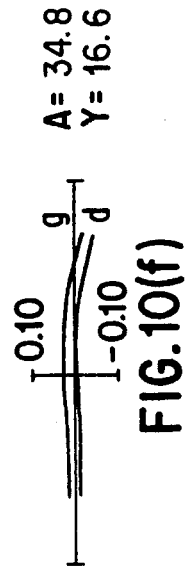
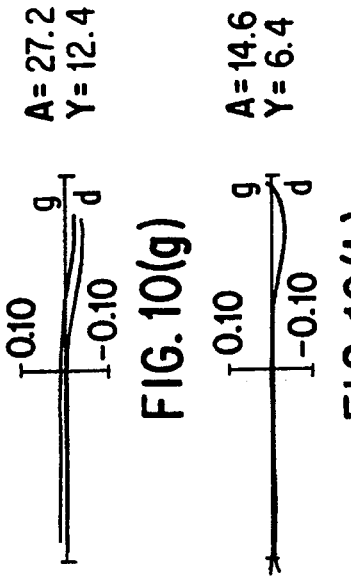
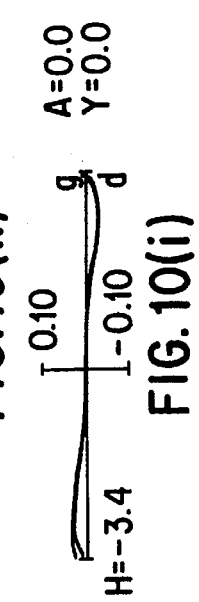
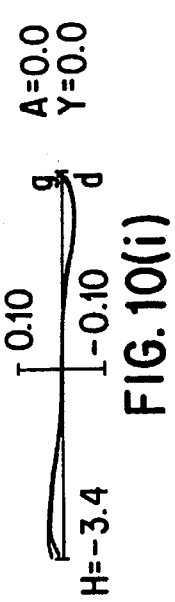
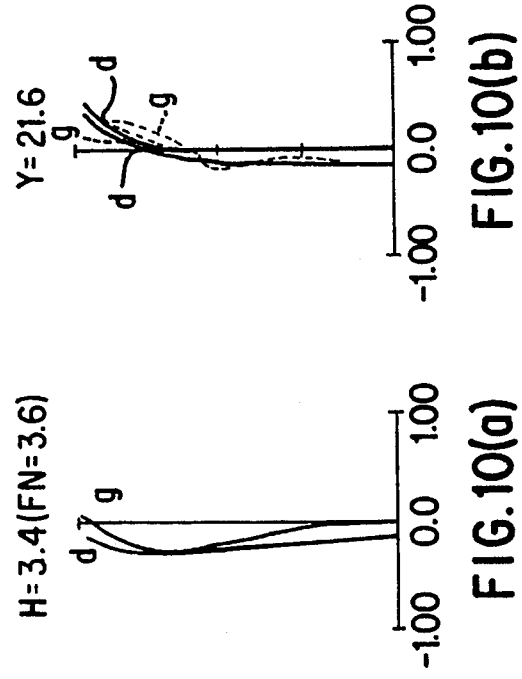
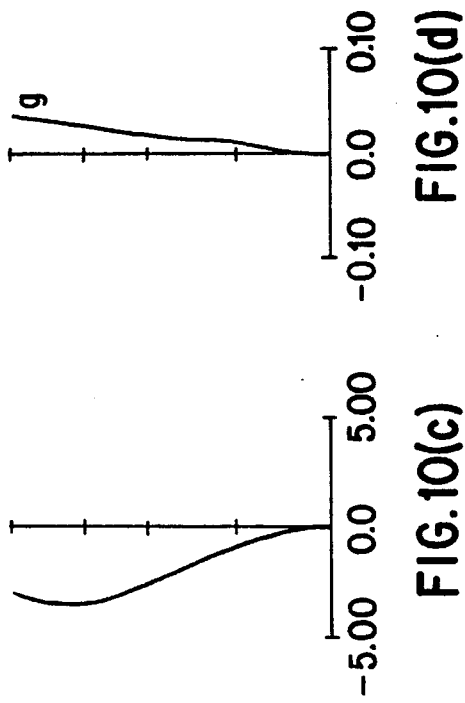

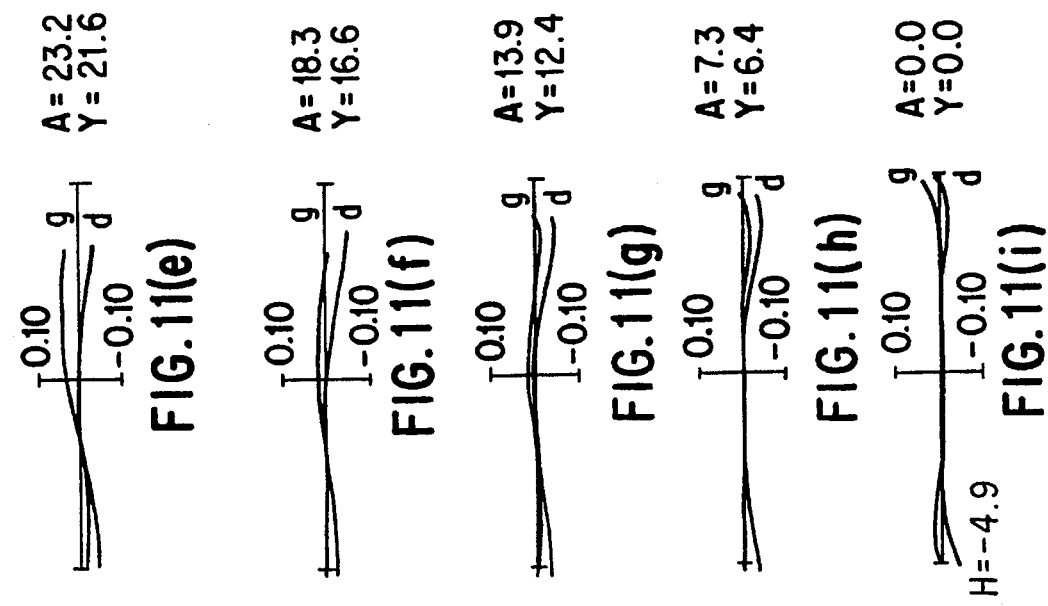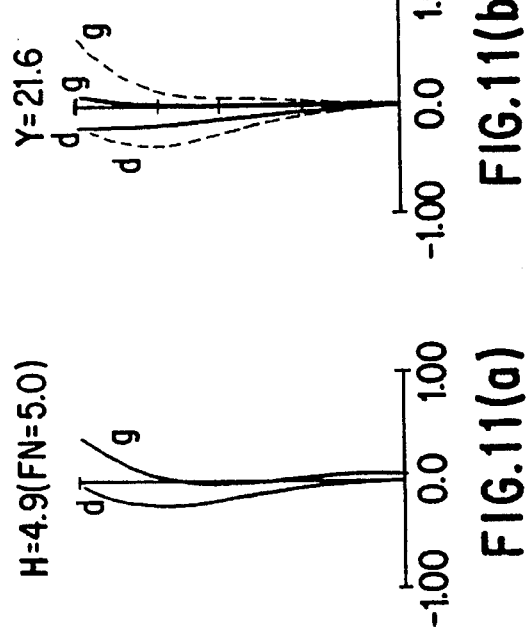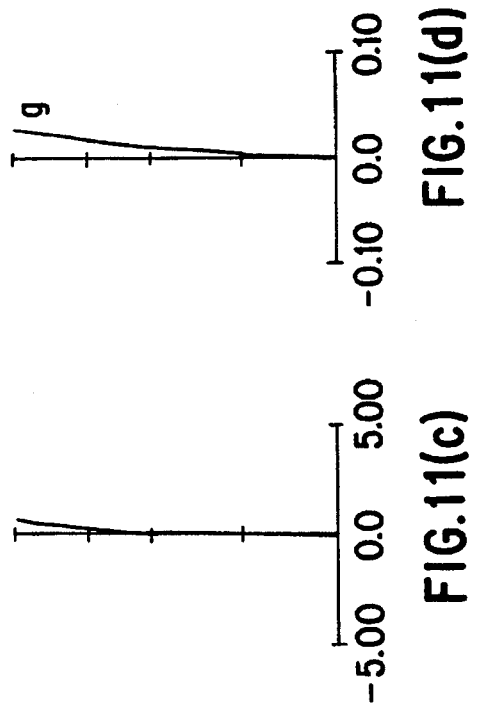

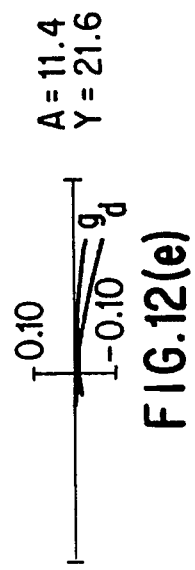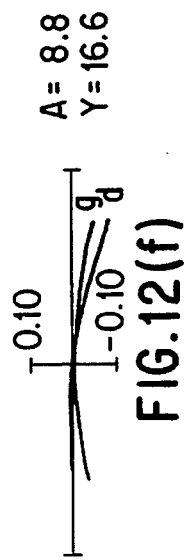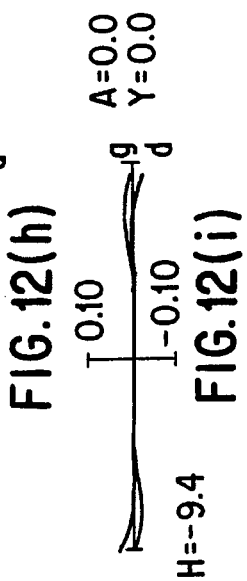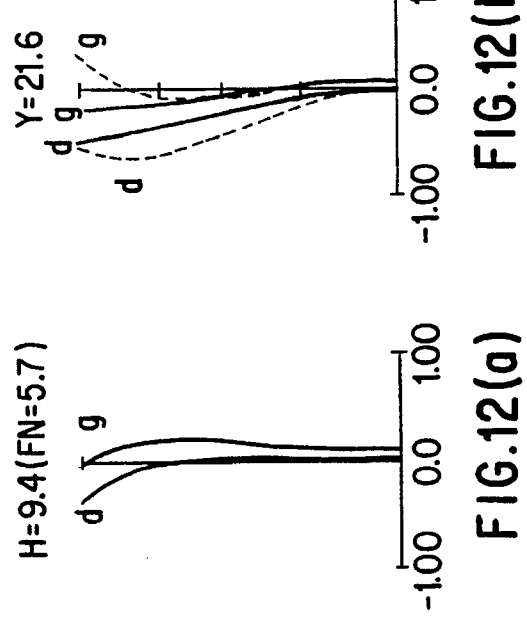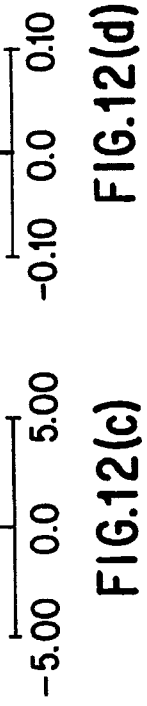

HIGH MAGNIFICATION ZOOM LENS

BACKGROUND OF THE INVENTION

1. Field of the Invention

The present invention relates to a high-magnification zoom lens, and in particular, to a high-magnification zoom lens having both a comparatively short lens system and superior image composing capability.

2. Description of Related Art

In recent years, together with the shift to zoom lenses having higher magnification and a reduced overall size, various types of zoom lenses have been introduced. In particular, high-magnification zoom lenses that have a magnification changing ratio of 3 to 5 times or more, a field angle of 70° and a telephoto range, are known. These lenses include, arranged in order along the optical axis from the object side (i.e., the side closest the object being photographed), a first lens group with a positive refractive power, a second lens group with a negative refractive power, and a third lens group with a positive refractive power.

In the conventional 3-group zoom lenses described above, however, the refractive power of each lens group must be increased to provide greater magnification and a wide angle region with a wider field angle. Similarly, to provide the same magnification and wide angle region in a zoom lens having a more compact size, the refractive power of each lens group must also be increased. As a result, the lens weight increases, and the manufacture of a lens surface having a high refractive power becomes very difficult. In addition, maintaining sufficient image composing capability over the range from the wide angle setting to the telephoto setting is difficult. Further, the size of the first lens group can become quite large, which is undesirable.

SUMMARY OF THE INVENTION

The present invention addresses the problems described above, and has an object of providing a compact, high-magnification zoom lens with superior image composing capability and a field angle of more than 80° in the wide angle range.

In order to accomplish the objective described above and others, the high-magnification zoom lens of the present invention is provided with a lens system having five lens groups, arranged in order from the object side including a first lens group G1 with a positive refractive power, a second lens group G2 with a negative refractive power, a third lens group G3 with a negative refractive power, a fourth lens group G4 with a positive refractive power, and an image composing lens group GR with a positive refractive power. When the lens system is changed from the wide angle setting to the telephoto setting to change the magnification, the first lens group G1 and the fourth lens group G4 move toward the object side such that the distance between the first lens group G1 and the second lens group G2 increases and the distance between the third lens group G3 and the fourth lens group G4 decreases. When the focal length of the first lens group G1 is taken as f1, the focal length of the second lens group G2 as f2, the focal length of the third lens group G3 as f3, the focal length of the entire lens system in the wide angle setting as fW, the focal length of the entire lens system at the telephoto setting as fT, the combined focal length of the second lens group G2 and the third lens group G3 at the wide angle end as f23, the distance between the second lens group G2 and the third lens group G3 at the optical axis at the wide angle end as DW23, and the distance between the second lens group G2 and the third lens group G3 at the optical axis at the telephoto end as DT23, the following conditions are satisfied:

$$1.1 \leq f1/(fW*fT)^{1/2} \leq 2.3$$

$$0.35 \leq f2/f3 \leq 0.75$$

$$0.18 \leq |f23|/(fW*fT)^{1/2} \leq 0.32$$

$$0.01 \leq (DT23-DW23)/fW \leq 0.12$$

The image composing lens group GR can include, arranged in order from the object side, a fifth lens group G5 having a positive refractive power and a sixth lens group G6 having a negative refractive power and a focal length of f6 such that $1.9 \leq |f6|/fW \leq 2.6$. If the fourth lens group G4 has a focal length of f4 and the image composing lens group GR in the wide angle setting has a focal length of fR, the zoom lens can be configured such that $0.30 \leq f4/fR \leq 0.85$.

According to another embodiment, the high-magnification zoom lens includes the five lens groups described above in a configuration such that when the lens system changes from the wide angle setting to the telephoto setting, the first lens group G1 and the fourth lens group G4 move toward the object side such that a distance between the first lens group G1 and the second lens group G2 increases, a distance between the second lens group G2 and the third lens group G3 changes, a distance between the third lens group G3 and the fourth lens group G4 decreases monotonically, a distance between the fourth lens group G4 and the image composing lens group GR changes, and $0.35 \leq f2/f3 \leq 0.75$.

In this embodiment, the high-magnification zoom lens can be configured such that the condition $0.01 \leq (DT23-DW23)/fW \leq 0.12$ is satisfied. The image composing lens group GR can include, arranged in order from the object side, a fifth lens group G5 having a positive refractive power and a sixth lens group G6 having a negative refractive power and a focal length f6 such that $1.9 \leq |f6|/fW \leq 2.6$. According to another aspect of this embodiment, the high-magnification zoom lens can be configured such that $1.1 \leq f1/(fW*fT)^{1/2} 2.3$, $0.18 \leq |f23|/(fW*fT)^{1/2} \leq 0.32$ and/or $0.30 \leq f4/fR \leq 0.85$.

According to another embodiment, when the lens system changes from the wide angle setting to the telephoto setting, a distance between the first lens group G1 and the second lens group G2 increases, a distance between the second lens group G2 and the third lens group G3 changes, a distance between the third lens group G3 and fourth lens group G4 decreases monotonically, a distance between the fourth lens group G4 and the image composing lens group GR changes, and $0.01 \leq (DT23-DW23)/fW \leq 0.12$.

In this embodiment, the high-magnification zoom lens can be configured such that the first lens group G1 and the fourth lens group G4 move toward the object side when the lens system changes from the wide angle setting to the telephoto setting. The image composing lens group GR can include, arranged in order from the object side, a fifth lens group G5 having a positive refractive power, a sixth lens group G6 having a negative refractive power and a focal length f6 such that $1.9 \leq |f6|/fW \leq 2.6$, and a changeable distance between the fifth lens group and the sixth lens group. According to another aspect of this embodiment, the high-magnification zoom lens can be configured such that $1.1 \leq f1/(fW*fT)^{1/2} \leq 2.3$, $0.18 \leq |f23|/(fW*fT)^{1/2} \leq 0.32$ and/or $0.30 \leq f4/fR \leq 0.85$.

According to another embodiment, when the lens system changes from the wide angle setting to the telephoto setting, the first lens group G1 and the fourth lens group G4 move toward the object side such that a distance between the first lens group G1 and the second lens group G2 increases, a distance between the second lens group G2 and the third lens group G3 changes, a distance between the third lens group G3 and the fourth lens group G4 decreases monotonically, a distance between the fourth lens group G4 and the image composing lens group GR changes, a distance between the fifth lens group and the sixth lens group changes, and $1.9 \leq |f6|/fW \leq 2.6$.

If the fourth lens group G4 has a focal length of f4 and the image composing lens group GR in the wide angle setting has a focal length of fR, the zoom lens can be configured such that $0.30 \leq f4/fR \leq 0.8$. According to another aspect of this embodiment, the high-magnification zoom lens can be configured such that $1.1 \leq f1/(fW*fT)^{1/2} \leq 2.3$ and $0.18 \leq |f23|/(fW*fT)^{1/2} \leq 0.32$.

According to still another embodiment, when the lens system changes from the wide angle setting to the telephoto setting, the first lens group G1 and the fourth lens group G4 move toward the object side such that a distance between the first lens group G1 and the second lens group G2 increases, a distance between the second lens group G2 and the third lens group G3 changes, a distance between the third lens group G3 and the fourth lens group G4 decreases monotonically, and $1.1 \leq f1/(fW*fT)^{1/2} \leq 2.3$ and $0.35 \leq f2/f3 \leq 0.75$.

In this embodiment, the high-magnification zoom lens can be configured such that the condition $0.01 \leq (DT23-DW23)/fW \leq 0.12$ is satisfied. According to another aspect of this embodiment, the high-magnification zoom lens can be configured such that $0.18 \leq |f23|/(fW*fT)^{1/2} \leq 0.32$.

According to yet another embodiment, when the lens system changes from the wide angle setting to the telephoto setting, a distance between the first lens group G1 and the second lens group G2 increases, a distance between the second lens group G2 and the third lens group G3 changes, a distance between the third lens group G3 and the fourth lens group G4 decreases monotonically, and $1.1 \leq f1/(fW*fT)^{1/2} \leq 2.3$ and $0.01 \leq (DT23-DW23)/fW \leq 0.12$.

In this embodiment, the high-magnification zoom lens can be configured such that the first lens group G1 and the fourth lens group G4 move toward the object side when the lens system changes from the wide angle setting to the telephoto setting. According to other aspects of this embodiment, the high-magnification zoom lens can be configured such that $0.35 \leq f2/f3 \leq 0.75$ and/or $0.18 \leq |f23|/(fW*fT)^{1/2} \leq 0.32$.

BRIEF DESCRIPTION OF THE DRAWINGS

A complete understanding of the present invention may be obtained by reference to the accompanying drawings, when considered in conjunction with the subsequent detailed description thereof, in which:

FIG. 1 is a schematic view that shows the lens structure of the zoom lens according to a first embodiment of the present invention in the wide angle and telephoto positions;

FIGS. 2(a) through (i) shows aberration diagrams for the wide angle position of the first embodiment;

FIGS. 3(a) through (i) show aberration diagrams for an intermediate focal length of the first embodiment;

FIGS. 4(a) through (i) show aberration diagrams for the telephoto position of the first embodiment;

FIGS. 6(a) through (i) show the various aberration diagrams for the wide angle position of the second embodiment;

FIGS. 7(a) through (i) show aberration diagrams for an intermediate focal length of the second embodiment;

FIGS. 8(a) through (i) show aberration diagrams for the telephoto position of the second embodiment;

FIGS. 10(a) through (i) show the various aberration diagrams for the wide angle position of the third embodiment;

FIGS. 11(a) through (i) show the various aberration diagrams for an intermediate focal length of the third embodiment; and FIGS. 12(a) through (i) show aberration diagrams for the telephoto setting of the third embodiment.

DETAILED DESCRIPTION OF PREFERRED EMBODIMENTS

Figure 5:
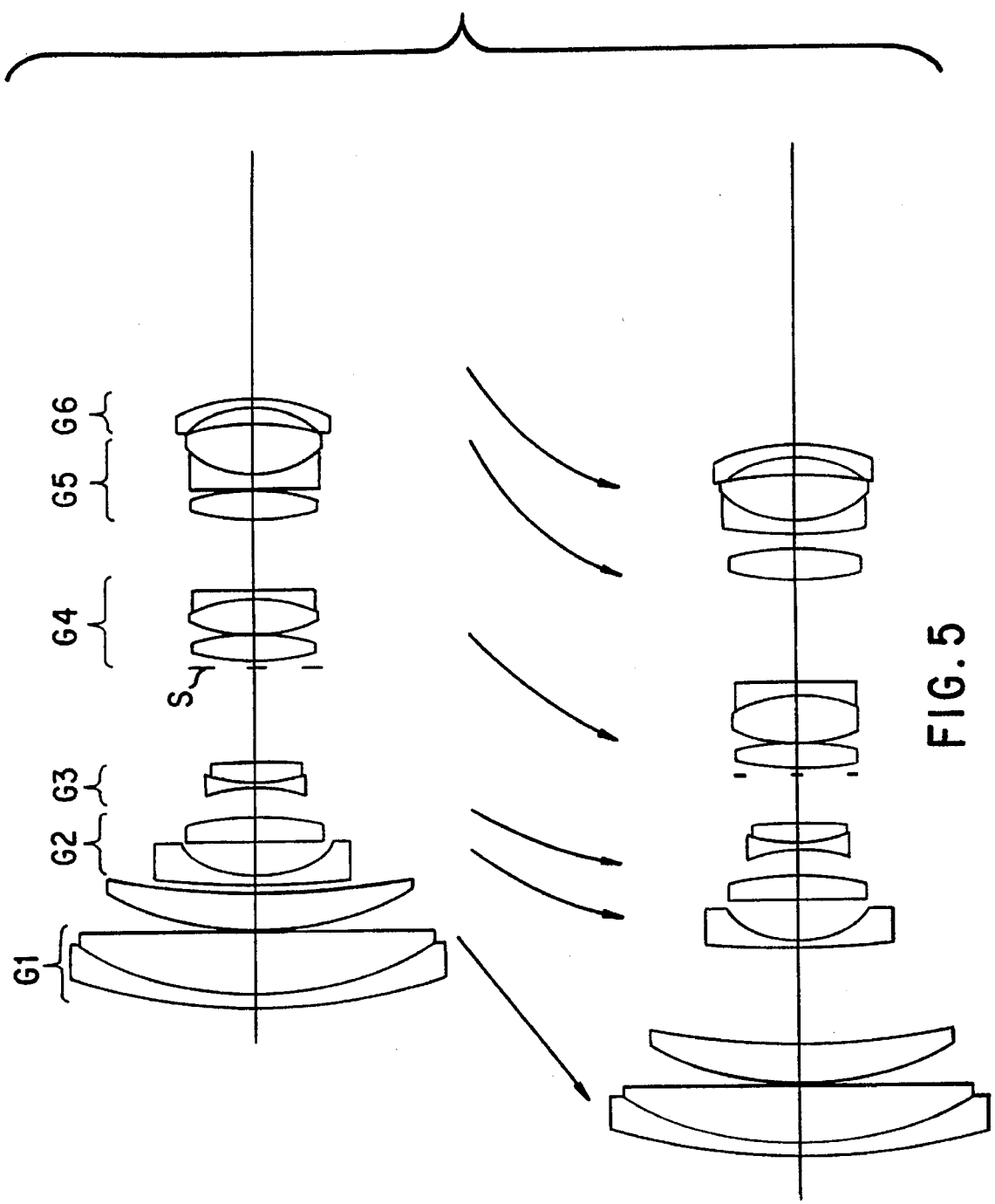
FIG. 5 is a schematic view that shows the lens structure of the zoom lens according to a second embodiment of the present invention in the wide angle and telephoto positions.

According to general optics theory, a zoom lens having multiple (i.e., more than two) lens groups can provide a higher zoom ratio because the number of magnification-changing lens groups increases. In addition, because the load of each lens group can be equalized, a superior image composing capability can be obtained.

In conventional zoom lenses, a complication arises in the structure of the lens barrel due to the increased number of movable lens groups. Based on recent advances in lens barrel technology, however, this complication is resolved. As zoom lenses become more compact and provide higher magnification, the problem of aberration changes and the like that accompany the changing magnification nevertheless remain. In the present invention, the detrimental effects due to increased refractive power are addressed by a lens structure that accounts for the characteristics of a multiple-group zoom lens. In other words, the zoom lens of the present invention includes, arranged in order from the object side, positive, negative, negative, and positive lens groups. As shown in FIG. 1, because the present invention has a first magnification changing group that includes the first lens group G1 with a positive refractive power and the second lens group G2 with a negative refractive power, and a second magnification changing group that includes the third lens group G3 with a negative refractive power and the fourth lens group G4 with a positive refractive power, a lens system that provides high magnification is achieved. Further, because each of the two negative lens groups can be configured to have a relatively weak refractive power, the structure of the lens groups can be simplified. As a result, the number of lenses and overall weight of the zoom lens can be reduced.

By way of comparison with a conventional zoom lens having a 3-group configuration, the present invention provides greater ease in correcting for aberration because of the increased degree of freedom for moving each lens group relative to the other lens groups. As a result, a superior image composing capability is achieved although the magnification is maintained at a high power.

To overcome aberration changes on a high-magnification zoom lens and to provide adequate image composing capability, the relative positions of each lens group in the intermediate focal length conditions (other than the wide angle and telephoto settings) must be considered. At intermediate focal length conditions, a light ray from the object point on the optical axis projects through a second lens group G2. When this light ray is reflected such that the distance between the second lens group G2 and the third lens group G3 along the optical axis increases non-linearly rather than linearly (i.e., so that the distance bulges to each side along the optical axis), and the distance along the axis increases at each intermediate focal length, the spherical aberration moves primarily in the negative direction, and the image surface curvature moves in the positive direction. In other words, these two aberrations move in opposite directions from each other. Accounting for these types of characteristics permits otherwise uncorrectable aberration changes of the lens groups other than the second lens group G2 and the third lens group G3 to be eliminated over the entire range.

When a sufficient degree of freedom for correcting aberration through the lens groups other than the second lens group G2 and the third lens group G3 exists, a proper image composing capability can be obtained even if the distance between the second lens group G2 and the third lens group G3 varies in a linear manner from the wide angle setting to the telephoto setting.

The zoom lens of the present invention satisfies the follow conditional formulas (1) through (4):

$$1.1 \leq f1/(fW*fT)^{1/2} \leq 2.3 \quad (1)$$

$$0.35 \leq f2/f3 \leq 0.75 \quad (2)$$

$$0.18 \vert f23 \vert/(fW*fT)^{1/2} \leq 0.32 \quad (3)$$

$$0.01 \leq (DT23-DW23)/fW \leq 0.12 \quad (4)$$

in which:
f1=the focal length of the first lens group G1;
f2=the focal length of the second lens group G2;
f3=the focal length of the third lens group G3;
fW=the focal length of the lens system as a whole in the wide angle setting;
fT=the focal length of the lens system as a whole in the telephoto setting;
f23=the combined focal length of the second lens group G2 and the third lens group G3 in the wide angle setting;
DW23=the distance between the second lens group G2 and the third lens group G3 along the optical axis in the wide angle setting; and
DT23=the distance between the second lens group G2 and the third lens group G3 along the optical axis in the telephoto setting.

Conditional formula (1) establishes the acceptable range relative to the focal length fW in the wide angle setting, the focal length fT in the telephoto setting, and the focal length f1 of the first lens group G1. If the upper limit of conditional formula (1) is exceeded, the overall length of the lens in the telephoto setting (the distance from the lens surface nearest the object side to the image surface) increases, and therefore, providing a compact lens becomes difficult. Furthermore, in the wide angle setting, fewer light rays from an off-axis object enter the lens resulting in an insufficient peripheral light amount, unless the diameter of the front lens is enlarged to compensate, which is undesirable.

Conversely, if the lower limit of conditional formula (1) is not satisfied, the focal length f1 of the first lens group G1 is too short, and the aberration correction in the telephoto setting is insufficient. In addition, correcting the spherical aberration through the lens groups that follow the second lens group G2 becomes difficult.

Conditional formula (2) establishes the acceptable range relative to the ratio of the focal length f2 of the second lens group G2 and the focal length f3 of the third lens group G3. If the upper limit of conditional formula (2) is exceeded, the focal length f3 of the third lens group G3 is too short. Further, because the principal light rays with the widest field angle in the second lens group G2 diverge from the optical axis, the peripheral light amount below the principal light rays is insufficient in the wide angle setting. Similarly, because the principal light rays with the widest field angle in the first lens group G1 diverge from the optical axis in the telephoto setting, the peripheral light amount below the principal light rays is insufficient. As a result, in both the wide angle and telephoto settings, the effective diameter of the second lens group G2 or the first lens group G1 must be increased by an undesirable margin. Furthermore, a sufficient image composing capability cannot be provided because the astigmatism is too large in the positive direction in the wide angle setting and the bottom side coma aberration is too large in the negative direction in the telephoto setting.

Conversely, if the lower limit of conditional formula (2) is not satisfied, the focal length f2 of the second lens group G2 is too short, and the astigmatism at the wide angle setting is too large in the negative direction. In the telephoto setting, the bottom side coma aberration is too large in the positive direction. Furthermore, increased variation of the coma aberration due to the changes in magnification results, which prevents a sufficient image composing capability from being obtained.

Conditional formula (3) establishes the acceptable range relative to the focal length fW of the lens system as a whole in the wide angle setting, the focal length fT of the lens system as a whole in the telephoto setting, and the combined focal length f23 of the second lens group G2 and the third lens group G3. If the upper limit of the conditional formula (3) is exceeded, the combined focal length f23 of the second lens group G2 and the third lens group G3 in the wide angle setting is too long, and the overall length of the lens in the telephoto setting increases. In addition, the .effective diameter must be increased because the peripheral light amount below the principal light rays is insufficient. Further, the astigmatism is too large in the negative direction in the wide angle setting. Conversely, if the lower limit of conditional formula (3) is not satisfied, the spherical aberration correction balance-worsens in the telephoto setting, the variation in the coma aberration due to change in magnification increases, and a proper image composing capability cannot be obtained.

Conditional formula (4) establishes the acceptable ratio relative to the difference between the distances between the second lens group G2 and the third lens group G3 in the wide angle and telephoto settings and the focal length fW of the lens system as a whole in the wide angle setting. If the upper limit of conditional formula (4) is exceeded, the overall length of the lens is too long in the telephoto setting. In addition, the effective diameter must be increased because the peripheral light amount below the principal light rays is insufficient. Further, the spherical aberration is insufficiently corrected in the telephoto setting.

Conversely, if the lower limit of conditional formula (4) is not satisfied, a sufficient variation in the useful magnification of the third lens group G3 cannot be obtained. As a result, equalizing the load of each lens group when the magnification is changed is difficult. Further, the variations in the various aberrations due to the changing magnification increase. In particular, the astigmatism in the wide angle setting worsens, the bottom side coma aberration is negative, and the spherical aberration in the telephoto end is overcorrected.

To obtain a better image composing capability, the following conditional formula (5) should be satisfied:

$$0.30 \leq f4/fR \leq 0.85 \quad (5)$$

in which:

f4=the focal length of the fourth lens group G4; and fR=the focal length of the image composing lens GR in the wide angle setting.

Conditional formula (5) establishes the acceptable range for the ratio of the focal length f4 of the fourth lens group G4 and the focal length fR of the image composing lens GR, which is positioned on the image side (i.e., the side opposite the object side) of the fourth lens group G4 in the wide angle setting.

If the upper limit of conditional formula (5) is exceeded, the focal length f4 of the fourth lens group G4 is too long, which results in undesirable increases in the effective diameter of the lens groups that follow the fourth lens group G4 and in the overall length of the lens. Conversely, if the lower limit of conditional formula (5) is not satisfied, correction is difficult and the spherical aberration worsens because the focal length f4 of the fourth lens group G4 is too short, and the fourth lens group G4 cannot correct the spherical aberration.

To obtain an even better image composing capability, the image composing lens group GR should be provided with, in order from the object side, a fifth lens group G5 with a positive refractive power and a sixth lens group G6 with a negative refractive power, and the following conditional formula (6) should be satisfied:

$$1.9 \leq |f6|/fW \leq 2.6 \quad (6)$$

in which f6 is the focal length of the sixth lens group G6.

Conditional formula (6) establishes the acceptable range relative to the focal length f6 of the sixth lens group G6 and the focal length fW of the lens system as a whole in the wide angle setting.

If the upper limit of conditional formula (6) is exceeded, the refractive power of the sixth lens group G6 is too weak, and the overall length of the lens cannot be decreased. In addition, because the magnification changing action of the sixth lens group G6 weakens and the other lenses must account for more of a change in magnification, the refractive powers of the other lenses must increase, which results in an overly complicated lens system.

Conversely, if the lower limit of conditional formula (6) is not satisfied, the refractive power of the sixth lens group G6 is too high, and a sufficient back focus cannot be maintained. Furthermore, the Petzval sum becomes negative, an undesirable image surface curvature can occur, and correcting aberration is difficult.

The zoom lens of the present invention includes five lens groups (which are arranged along an optical axis in order from the object side): a first lens group G1 with a positive refractive power; a second lens group G2 with a negative refractive power; a third lens group G3 with a negative refractive power; a fourth lens group G4 with a positive refractive power; and an image composing lens group GR with a positive refractive power. When the zoom lens is changed from the wide angle setting to the telephoto setting to change the magnification, the first lens group G1 and the fourth lens group G4 move toward the object side such that the distance between the first lens group G1 and the second lens group G2 increases and the distance between the third lens group G3 and the fourth lens group G4 decreases.

FIG. 1 shows the lens structure of a zoom lens of a first embodiment of the present invention. The zoom lens is provided with a first lens group G1 that includes a compound lens formed by a negative meniscus lens with a convex surface on the object side, a biconvex lens and a positive meniscus lens with a convex surface on the object side; a second lens group G2 that includes a negative meniscus lens with a convex surface on the object side and a compound lens formed by a biconcave lens and a biconvex lens; a third lens group G3 that includes a compound lens formed by a biconcave lens and a biconvex lens; a fourth lens group G4 that includes a biconvex lens and a compound lens formed by a biconvex lens and a biconcave lens; a fifth lens group G5 that includes a biconvex lens and a compound lens formed by a biconcave lens and a biconvex lens; and a sixth lens group G6 that includes a negative meniscus lens with a concave surface on the object side.

The fifth lens group G5 and the sixth lens group G6 form an image composing lens group GR that is positioned on an image side of the fourth lens group G4. In addition, an aperture stop S is positioned between the third lens group G3 and the fourth lens group G4.

FIG. 1 shows the relative positions of each lens group in the wide angle setting. When the setting is changed to the telephoto setting to change the magnification, the lens groups move along the optical axis until they reach the positions shown below the arrows.

Values for the various characteristics of the first embodiment of the present invention are given in Table 1. In Table 1, f indicates the focal length, FNO indicates the f-number, 2w indicates the field angle, and Bf indicates the back focus. The numbers at the left indicate the order of each lens surface from the object side, r indicates the radius of curvature of each lens surface, d indicates the distance between each lens surface, n and v indicate the index of refraction for the d-line ($\lambda$=587.6 nm) and the Abbe number, respectively.

Also, in each embodiment, the aspherical surfaces are defined by the following formula (a):

$$S(y)=(y^2/R)/[1+(1-k*y^2/R^2)^{1/2}]+C_2*y^2+C_4*y^4+C_6*y^6+C_8*y^8+C_{10}*y^{10}+ \quad (a)$$

when y is taken as the vertical distance from the optical axis, S(y) as the amount the position shifts in the optical axis direction at height y, R as the reference radius of curvature, k as the conical coefficient, and Cn as the nth aspherical surface coefficient.

The radius of curvature r of the aspherical surface near the optical axis is defined by the following formula (b):

$$r=1/(2C_2+1/R) \quad (b)$$

The aspherical surfaces for each embodiment are denoted by an asterisk (*) to the right of the surface number.

TABLE 1 f = 24.7–107.0 mm
FNO = 3.6–5.7
2w = 84.38–22.82°

|   | r | d | v | n |
|---|---|---|---|---|
| 1 | 100.167 | 1.70 | 25.5 | 1.80458 |
| 2 | 50.917 | 9.50 | 69.9 | 1.51860 |
| 3 | −50919.199 | 0.10 | | |
| 4 | 46.295 | 5.50 | 52.3 | 1.74810 |
| 5 | 111.670 | (d5 = variable) | | |
| 6* | 291.734 | 1.30 | 47.5 | 1.78797 |
| 7 | 14.339 | 5.00 | | |
| 8 | −911.740 | 2.00 | 47.5 | 1.78797 |

TABLE 1-continued

| | | | |
|---|---|---|---|
| 9 | 16.815 | 4.40 33.7 | 1.64831 |
| 10 | −64.186 | (d10 = variable) | |
| 11 | −24.775 | 1.30 52.3 | 1.74810 |
| 12 | 29.316 | 2.60 25.5 | 1.80458 |
| 13 | −135.743 | (d13 = variable) | |
| 14 | 44.430 | 3.50 60.3 | 1.51835 |
| 15 | −40.585 | 0.10 | |
| 16 | 25.006 | 5.00 54.6 | 1.51454 |
| 17 | −27.537 | 1.50 33.9 | 1.80384 |
| 18 | 196.540 | (d18 = variable) | |
| 19 | 45.381 | 4.00 64.1 | 1.51680 |
| 20 | −40.087 | 0.50 | |
| 21 | −721.357 | 2.10 28.6 | 1.79504 |
| 22 | 14.841 | 8.00 37.0 | 1.61293 |
| 23 | −33.726 | (d23 = variable) | |
| 24 | −16.321 | 1.50 47.5 | 1.78797 |
| 25 | −28.703 | Bf | |

(variable distances at the changing of magnification)

| | | | |
|---|---|---|---|
| f | 24.7021 | 49.9672 | 107.0044 |
| d0 | 0.0000 | 0.0000 | 0.0000 |
| d5 | 1.2000 | 14.0258 | 31.8884 |
| d10 | 2.3658 | 5.2196 | 4.3529 |
| d13 | 16.1207 | 7.1250 | 2.5471 |
| d18 | 11.6342 | 6.5811 | 3.7159 |
| d23 | 2.0064 | 3.4616 | 5.3233 |
| Bf | 37.9994 | 60.1937 | 73.4684 |

(aspherical surface data)

| | k | $C_2$ | $C_4$ |
|---|---|---|---|
| surface 6 | 1.000 | 0.000 | $0.11810 \times 10^{-4}$ |
| | $C_6$ | $C_8$ | $C_{10}$ |
| | $-0.70300 \times 10^{-8}$ | $-0.10200 \times 10^{-9}$ | $0.28910 \times 10^{-12}$ |

(values corresponding to conditions)

(1) $f1/(fw*fT)^{1/2}$ = 1.6083
(2) $f2/f3$ = 0.4462
(3) $|f23|/(fw*fT)^{1/2}$ = 0.2326
(4) $(DT23-DW23)/fW$ = 0.0804
(5) $f4/fR$ = 0.3270
(6) $|f6|/fW$ = 2.0533

FIGS. 2(a)–2(i), 3(a)–3(i) and 4(a)–4(i) are the various aberration diagrams for the first embodiment. FIGS. 2(a)–2(i) show the various aberration diagrams for the wide angle setting (the shortest focal length condition); FIGS. 3(a)–3(i) show the various aberration diagrams for an intermediate-focal length condition; and FIGS. 4(a)–4(i) show the various aberration diagrams for the telephoto setting (the longest focal length condition).

In each aberration diagram, FN indicates the f-number, H indicates the height of incident light, Y indicates the image height, A indicates the angle of incidence of the principal light rays, d indicates the d-line (λ=587.6 nm), and g indicates the g-line (λ=435.8 nm).

In addition, in the aberration diagram showing the astigmatism (FIGS. 2(b), 3(b) and 4(b)), the solid line indicates the sagittal image plane, and the dashed line indicates the meridional image plane. As is shown in each aberration diagram, the various aberrations are properly corrected for each focal length condition with the present invention.

FIG. 5 shows the lens structure of a zoom lens of a second embodiment of the present invention. The zoom lens is provided with a first lens group G1 that includes a compound lens formed by a negative meniscus lens with a convex surface on the object side, a flat convex lens with a convex surface on the object side and a positive meniscus lens with a convex surface on the object side; a second lens group G2 that includes a negative meniscus lens with a convex surface on the object side and a positive meniscus lens with a concave surface on the object side; a third lens group G3 that includes a compound lens formed by a biconcave lens and a biconvex lens; a fourth lens group G4 that includes a biconvex lens and a compound lens formed by a biconvex lens and a biconcave lens; a fifth lens group G5 that includes a biconvex lens and a compound lens formed by a negative meniscus lens with a convex surface on the object side and a biconvex lens; and a sixth lens group G6 that includes a negative meniscus lens with a concave surface on the object side.

The fifth lens group G5 and the sixth lens group G6 form an image composing lens group GR that is positioned on the image side of the fourth lens group G4. In addition, an aperture stop S is positioned between the third lens group G3 and the fourth lens group G4.

FIG. 5 shows the relative positions of each lens group in the wide angle setting. When the setting is changed to the telephoto setting to change the magnification, the lens groups move along the optical axis until they reach the positions shown below the arrows.

Values for the various characteristics of the second embodiment are given in Table 2. In Table 2, similar to Table 1, f indicates the focal length, FNO indicates the f-number, 2w indicates the field angle, and Bf indicates the back focus. The numbers at the left indicate the order of each lens surface from the object side, r indicates the radius of curvature of each lens surface, d indicates the distance between each lens surface, and n and v indicate the index of refraction for the d-line (λ=587.6 nm) and the Abbe number, respectively.

TABLE 2 f = 24.7–102.0 mm
FNO = 3.6–5.7
2w = 84.64–23.62°

| | r | d | v | n |
|---|---|---|---|---|
| 1 | 87.117 | 1.30 | 25.5 | 1.80458 |
| 2 | 54.759 | 7.00 | 70.1 | 1.51860 |
| 3 | ∞ | 0.10 | | |
| 4 | 57.233 | 3.80 | 60.8 | 1.56384 |
| 5 | 130.143 | (d5 = variable) | | |
| 6* | −785.211 | 1.30 | 47.5 | 1.78797 |
| 7 | 15.995 | 6.00 | | |
| 8 | −206.702 | 3.50 | 32.3 | 1.60137 |
| 9 | −38.849 | (d9 = variable) | | |
| 10 | −26.086 | 1.30 | 52.3 | 1.74810 |
| 11 | 25.438 | 2.90 | 25.5 | 1.80458 |
| 12 | −216.355 | (d12 = variable) | | |
| 13 | 59.344 | 3.50 | 60.3 | 1.51835 |
| 14 | −53.229 | 0.10 | | |
| 15 | 27.608 | 7.00 | 54.6 | 1.51435 |
| 16 | −26.108 | 2.00 | 33.9 | 1.80384 |
| 17 | 121.415 | (d17 = variable) | | |
| 18 | 44.891 | 4.50 | 64.1 | 1.51680 |
| 19 | −38.478 | 2.50 | | |
| 20 | 128.046 | 2.10 | 28.6 | 1.79504 |
| 21 | 16.039 | 7.30 | 37.0 | 1.61293 |
| 22 | −51.248 | (d22 = variable) | | |
| 23 | −18.758 | 1.50 | 49.4 | 1.77279 |
| 24 | −32.036 | Bf | | |

(variable distances at the changing of magnification)

| | | | |
|---|---|---|---|
| f | 24.7045 | 49.9997 | 102.0033 |
| d0 | 0.0000 | 0.0000 | 0.0000 |
| d5 | 1.3779 | 13.8507 | 36.5549 |
| d9 | 1.6387 | 5.5477 | 3.5501 |
| d12 | 20.0988 | 7.7744 | 2.8625 |
| d17 | 13.3223 | 8.3786 | 5.4221 |
| d22 | 2.7102 | 4.1303 | 6.0872 |
| Bf | 37.9993 | 60.1941 | 73.4687 |

(aspherical surface data)

| | k | $C_2$ | $C_4$ |
|---|---|---|---|
| surface 6 | 1.000 | 0.000 | $0.12610 \times 10^{-4}$ |

TABLE 2-continued

| $C_6$ | $C_8$ | $C_{10}$ |
|---|---|---|
| $-0.43420 \times 10^{-8}$ | $-0.64590 \times 10^{-10}$ | $0.13970 \times 10^{-12}$ |

(values corresponding to conditions)

| | |
|---|---|
| (1) $f1/(fw*fT)^{1/2} =$ | 2.0819 |
| (2) $f2/f3 =$ | 0.6995 |
| (3) $|f23|/(fw*fT)^{1/2} =$ | 0.3072 |
| (4) $(DT23-DW23)/fW =$ | 0.0774 |
| (5) $f4/fR =$ | 0.7865 |
| (6) $|f6|/fW =$ | 2.4934 |

FIGS. 6(a)–6(i), 7(a)–7(i) and 8(a)–8(i) are the various aberration diagrams for the second embodiment. FIGS. 6(a)–6(i) show the various aberration diagrams for the wide angle setting; FIGS. 7(a)–7(i) show the various aberration diagrams for an intermediate focal length condition; and FIGS. 8(a)–8(i) show the various aberration diagrams for the telephoto setting.

In each aberration diagram, FN indicates the f-number, H indicates the height of incident light, Y indicates the image height, A indicates the angle of incidence of the principal light rays, d indicates the d-line ($\lambda=587.6$ nm), and g indicates the g-line ($\lambda=435.8$ nm).

In addition, in the aberration diagram showing the astigmatism (FIGS. 6(b), 7(b) and 8(b)), the solid line indicates the sagittal image plane, and the dashed line indicates the meridional image plane. As is shown in each aberration diagram, the various aberrations are properly corrected for each focal length condition with the present invention.

Figure 9:
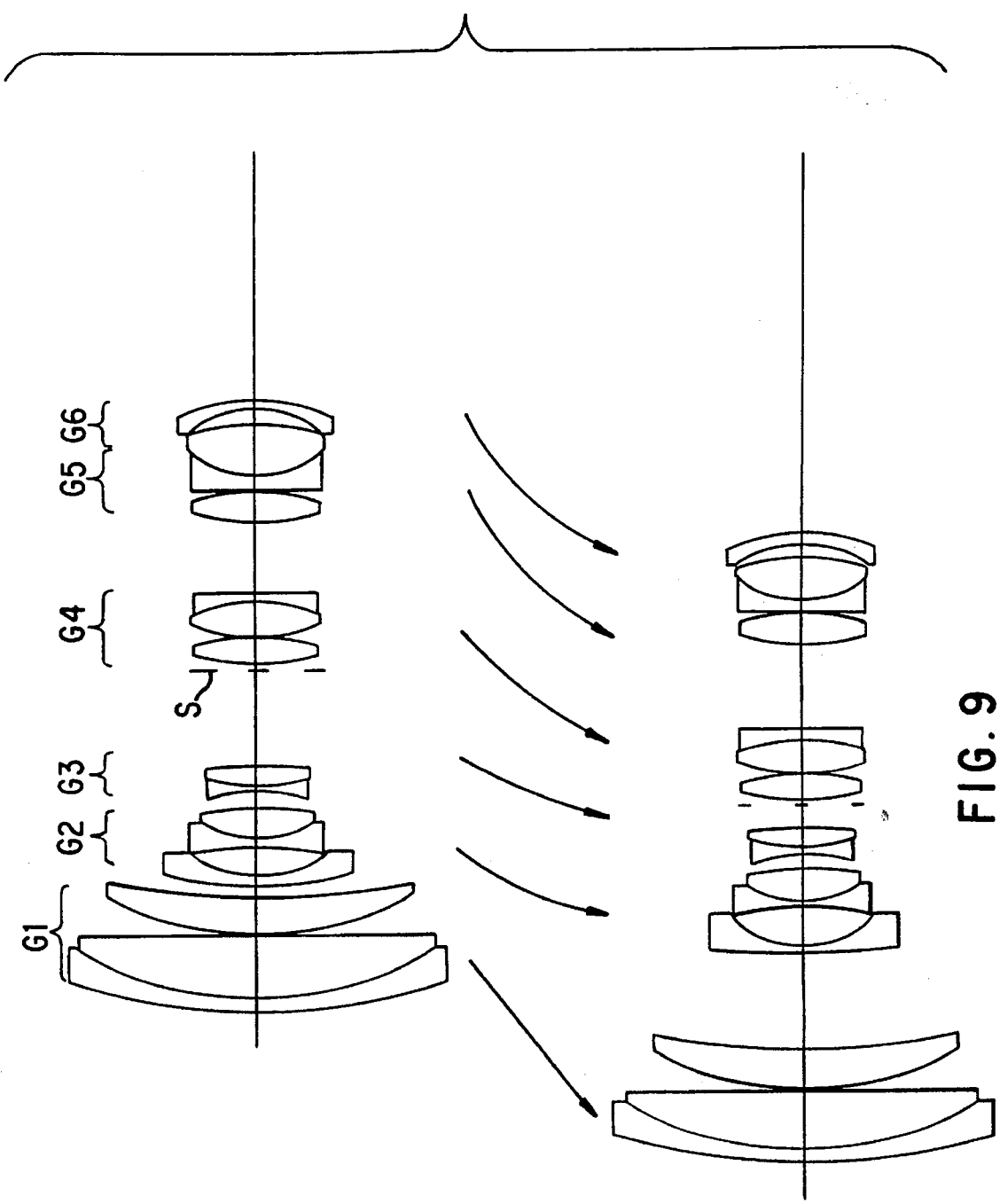
FIG. 9 is a schematic view that shows the lens structure of the zoom lens according to a third embodiment of the present invention in the wide angle and telephoto positions.

FIG. 9 shows the lens structure of a zoom lens of a third embodiment of the present invention. The zoom lens of FIG. 9 is provided with a first lens group G1 that includes a compound lens formed by a negative meniscus lens with a convex surface on the object side, a positive meniscus lens with a convex surface on the object side, and a positive meniscus lens with a convex surface on the object side; a second lens group G2 that includes a negative meniscus lens with a convex surface on the object side and a compound lens formed by a biconcave lens and a biconvex lens; a third lens group G3 that includes a compound lens formed by a biconcave lens and a biconvex lens; a fourth lens group G4 that includes a biconvex lens and a compound lens formed by a biconvex lens and a biconcave lens; a fifth lens group G5 that includes a biconvex lens and a compound lens formed by a biconcave lens and a biconvex lens; and a sixth lens group G6 that includes a negative meniscus lens with a concave surface on the object side.

The fifth lens group G5 and the sixth lens group G6 form an image composing lens group GR that is positioned on the image side of the fourth lens group G4. In addition, an aperture stop S is positioned between the third lens group G3 and the fourth lens group G4.

FIG. 9 shows the relative positions of each lens group in the wide angle position. When the setting is changed to the telephoto setting to change the magnification, the lens groups move along the optical axis until they reach the positions shown below the arrows.

Values for the various items of the third embodiment are given in the following Table 3. In Table 3, similar to Tables 1 and 2, f indicates the focal length, FNO indicates the f-number, 2w indicates the field angle, and Bf indicates the back focus. The numbers at the left indicate the order of each lens surface from the object side, r indicates the radius of curvature of each lens surface, d indicates the distance between each lens surface, and n and v indicate the index of refraction for the d-line ($\lambda=587.6$ nm) and the Abbe number, respectively.

TABLE 3 f = 24.7–107.0 mm
FNO = 3.6–5.7
2w = 84.08–22.82°

| | r | d | v | n |
|---|---|---|---|---|
| 1 | 86.357 | 1.70 | 25.5 | 1.80458 |
| 2 | 43.966 | 7.50 | 69.9 | 1.51860 |
| 3 | 790.942 | 0.10 | | |
| 4 | 37.237 | 5.00 | 52.3 | 1.74810 |
| 5 | 92.335 | (d5 = variable) | | |
| 6* | 94.977 | 1.30 | 47.5 | 1.78797 |
| 7 | 12.884 | 5.00 | | |
| 8 | −55.179 | 2.00 | 47.5 | 1.78797 |
| 9 | 21.410 | 4.00 | 33.7 | 1.64831 |
| 10 | −33.668 | (d10 = variable) | | |
| 11 | −18.911 | 1.30 | 52.3 | 1.74810 |
| 12 | 51.636 | 2.90 | 25.5 | 1.80458 |
| 13 | −59.587 | (d13 = variable) | | |
| 14 | 47.752 | 3.20 | 60.3 | 1.51835 |
| 15 | −38.918 | 0.10 | | |
| 16 | 26.142 | 4.80 | 54.6 | 1.51454 |
| 17 | −27.534 | 1.50 | 33.9 | 1.80384 |
| 18 | 286.264 | (d18 = variable) | | |
| 19 | 45.814 | 4.00 | 64.1 | 1.51680 |
| 20 | −40.022 | 0.50 | | |
| 21 | −586.603 | 2.10 | 28.6 | 1.79504 |
| 22 | 15.189 | 6.00 | 37.0 | 1.61293 |
| 23 | −32.548 | (d23 = variable) | | |
| 24 | −16.722 | 1.50 | 47.5 | 1.78797 |
| 25 | −30.017 | 38.21 | | |

(variable distance at the changing of magnification)

| f | 24.7000 | 50.0000 | 107.0000 |
|---|---|---|---|
| d0 | 0.0000 | 0.0000 | 0.0000 |
| d5 | 1.3119 | 9.1922 | 26.8651 |
| d10 | 2.3165 | 4.2264 | 4.7758 |
| d13 | 15.0314 | 5.9225 | 1.2084 |
| d18 | 12.3217 | 8.1563 | 5.5439 |
| d23 | 2.4686 | 3.9232 | 5.4176 |
| Bf | 38.2082 | 63.0114 | 70.8812 |

(aspherical surface data)

surface 6

| k | $C_2$ | $C_4$ |
|---|---|---|
| 1.000 | 0.000 | $0.10830 \times 10^{-4}$ |

| $C_6$ | $C_8$ | $C_{10}$ |
|---|---|---|
| $-0.18410 \times 10^{-8}$ | $-0.10030 \times 10^{-9}$ | $0.32820 \times 10^{-12}$ |

(values corresponding to conditions)

| | |
|---|---|
| (1) $f1/(fw*fT)^{1/2} =$ | 1.3465 |
| (2) $f2/f3 =$ | 0.4765 |
| (3) $|f23|/(fw*fT) =$ | 0.2235 |
| (4) $(DT23-DW23)/fW =$ | 0.0996 |
| (5) $f4/fR =$ | 0.3503 |
| (6) $|f6|/fW =$ | 2.0413 |

FIGS. 10(a)–(i), 11(a)–11(i) and 12(a)–(i) are the various aberration diagrams for the third embodiment. FIGS. 10(a)–(i) show the various aberration diagrams for the wide angle setting; FIGS. 11(a)–(i) show the various aberration diagrams for an intermediate focal length condition; and FIGS. 12(a)–(i) show the various aberration diagrams for the telephoto setting.

In each aberration diagram, FN indicates the f-number, H indicates the height of incident light, Y indicates the image height, A indicates the angle of incidence of the principal light rays, d indicates the d-line ($\lambda=587.6$ nm), and g indicates the g-line ($\lambda=435.8$ nm).

In addition, in the aberration diagram showing the astigmatism (FIGS. 10(b), 11(b) and 12(b)), the solid line indicates the sagittal image plane, and the dashed line indicates the meridional image plane. As is shown in each aberration diagram, the various aberrations are properly corrected for each focal length condition with the present invention.

According to the present invention, a high-magnification zoom lens that has a comparatively short overall lens length and a superior image composing capability can be provided for wide angle (exceeding 80° on 35 mm equipment) and telephoto photography.

Although this invention is described in conjunction with specific embodiments thereof, many alternatives, modifications and variations will be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. A high-magnification zoom lens having a lens system movable along an optical axis from a wide angle setting to a telephoto setting, said lens system having a focal length of fW in said wide angle setting and a focal length of fT in said telephoto setting, said lens system comprising five lens groups arranged in order from an object side including:

a first lens group having a positive refractive power and a focal length of f1;

a second lens group having a negative refractive power and a focal length of f2;

a third lens group having a negative refractive power and a focal length of f3, wherein a combined focal length of said second lens group and said third lens group in said wide angle setting is f23, a distance between said second lens group and said third lens group along said optical axis in said wide angle setting is DW23, and a distance between said second lens group and said third lens group along said optical axis in said telephoto setting is DT23;

a fourth lens group having a positive refractive power; and an image composing lens group having a positive refractive power, wherein when said lens system changes from said wide angle setting to said telephoto setting, said first lens group and said fourth lens group move toward said object side such that a distance between said first lens group and said second lens group increases and a distance between said third lens group and said fourth lens group decreases such that:

$1.1 \leq f1/(fW*fT)^{1/2} \leq 2.3$ $0.35 \leq f2/f3 \leq 0.75$ $0.18 \leq |f23|/(fW*fT)^{1/2} \leq 0.32$ $0.01 \leq (DT23-DW23)/fW \leq 0.12$.

2. The high-magnification zoom lens of claim 1, wherein said image composing lens group further comprises in order from said object side a fifth lens group having a positive refractive power and a sixth lens group having a negative refractive power and a focal length of f6, and wherein $1.9 \leq |f6|/fW \leq 2.6$.

3. The high-magnification zoom lens of claim 1, wherein said fourth lens group has a focal length of f4 and said image composing lens group in said wide angle setting has a focal length of fR, and wherein $0.30 \leq f4/fR \leq 0.85$.

4. The high-magnification zoom lens of claim 3, wherein said image composing lens group GR further comprises in order from said object side a fifth lens group having a positive refractive power and a sixth lens group having a negative refractive power and a focal length of f6, and wherein $1.9 \leq |f6|/fW \leq 2.6$.

5. A high-magnification zoom lens having a lens system movable along an optical axis from a wide angle setting to a telephoto setting, said lens system comprising five lens groups arranged in order from an object side including:

a first lens group having a positive refractive power;

a second lens group having a negative refractive power and a focal length of f2;

a third lens group having a negative refractive power and a focal length of f3;

a fourth lens group having a positive refractive power; and an image composing lens group having a positive refractive power, wherein when said lens system changes from said wide angle setting to said telephoto setting, said first lens group and said fourth lens group move toward said object side such that a distance between said first lens group and said second lens group increases, a distance between said second lens group and said third lens group changes, a distance between said third lens group and said fourth lens group decreases monotonically, and a distance between said fourth lens group and said image composing lens group changes, and wherein $0.35 \leq f2/f3 \leq 0.75$, wherein said lens system has a focal length of fW in said wide angle setting and a focal length of fT in said telephoto setting, said first lens group has a focal length of f1, a combined focal length of said second lens group and said third lens group in said wide angle setting is f23, and wherein $1.1 \leq f1/(fW*fT)^{1/2} \leq 2.3$ and $0.18 \leq |f23|/(fW*fT)^{1/2} \leq 0.32$.

6. The high-magnification zoom lens of claim 5, wherein a distance between said second lens group and said third lens group along said optical axis in said wide angle setting is DW23, and a distance between said second lens group and said third lens group along said optical axis in said telephoto setting is DT23, and wherein $0.01 \leq (DT23-DW23)/fW \leq 0.12$.

7. The high-magnification zoom lens of claim 5, wherein said image composing lens group further comprises a fifth lens group having a positive refractive power and a sixth lens group having a negative refractive power and a focal length of f6, a distance between said fifth lens group and said sixth lens group being changeable, and wherein $1.9 \leq |f6|/fW \leq 2.6$.

8. The high-magnification zoom lens of claim 5, wherein said fourth lens group has a focal length of f4 and said image composing lens group in said wide angle setting has a focal length of fR, and wherein $0.30 \leq f4/fR \leq 0.85$.

9. A high-magnification zoom lens having a lens system movable along an optical axis from a wide angle setting to a telephoto setting, said lens system in said wide angle setting having a focal length of fW, said lens system in said telephoto setting having a focal length of fT, said lens system comprising five lens groups arranged in order from an object side including:

a first lens group having a positive refractive power;

a second lens group having a negative refractive power and a focal length of f2;

a third lens group having a negative refractive power and a focal length of f3, wherein a distance between said second lens group and said third lens group along said optical axis in said wide angle setting is DW23, and a distance between said second lens group and said third lens group along said optical axis in said telephoto setting is DT23;

a fourth lens group having a positive refractive power; and an image composing lens group having a positive refractive power, wherein when said lens system changes from said wide angle setting to said telephoto setting, a distance between said first lens group and said second lens group increases, a distance between said second lens group and said third lens group changes, a distance between said third lens group and said fourth lens group decreases monotonically, and a distance between said fourth lens group and said image composing lens group changes, and wherein $0.01 \leq (DT23-DW23)/fW \leq 0.12$, wherein said lens system in said wide angle setting has a focal length of fW, said lens system in said telephoto setting has a focal length of fT, said first lens group has a focal length of f1, a combined focal length of said second lens group and said third lens group in said wide angle setting is f23, and wherein $1.1 \leq f1/(fW*fT)^{1/2} \leq 2.3$ and $0.18 \leq |f23|/(fW*fT)^{1/2} \leq 0.32$.

10. The high-magnification zoom lens of claim 9, wherein said first lens group and said fourth lens group move toward said object side when said lens system changes from said wide angle setting to said telephoto setting.

11. The high-magnification zoom lens of claim 9, wherein said image composing lens group further comprises a fifth lens group having a positive refractive power and a sixth lens group having a negative refractive power and a focal length of f6, a distance between said fifth lens group and said sixth lens group being changeable, and wherein $1.9 \leq |f6|/fW \leq 2.6$.

12. A high-magnification zoom lens having a lens system movable along an optical axis from a wide angle setting to a telephoto setting, said lens system in said wide angle setting having a focal length of fW, said lens system in said telephoto setting having a focal length of fT, said lens system comprising five lens groups arranged in order from an object side including:

a first lens group having a positive refractive power;

a second lens group having a negative refractive power and a focal length of f2;

a third lens group having a negative refractive power and a focal length of f3, wherein a distance between said second lens group and said third lens group along said optical axis in said wide angle setting is DW23, and a distance between said second lens group and said third lens group along said optical axis in said telephoto setting is DT23;

a fourth lens group having a positive refractive power; and an image composing lens group having a positive refractive power, wherein when said lens system changes from said wide angle setting to said telephoto setting, a distance between said first lens group and said second lens group increases, a distance between said second lens group and said third lens group changes, a distance between said third lens group and said fourth lens group decreases monotonically, and a distance between said fourth lens group and said image composing lens group changes, and wherein $0.01 \leq (DT23-DW23)/fW \leq 0.12$, wherein said fourth lens group has a focal length of f4 and said image composing lens group in said wide angle setting has a focal length of fR, and wherein $0.30 \leq f4/fR \leq 0.85$.

13. The high-magnification zoom lens of claim 12, wherein said first lens group and said fourth lens group move toward said object side when said lens system changes from said wide angle setting to said telephoto setting.

14. A high-magnification zoom lens having a lens system movable along an optical axis from a wide angle setting to a telephoto setting, said lens system in said wide angle setting having a focal length of fW, said lens system comprising five lens groups arranged in order from an object side including:

a first lens group having a positive refractive power;

a second lens group having a negative refractive power;

a third lens group having a negative refractive power;

a fourth lens group having a positive refractive power; and an image composing lens group having a positive refractive power, said image composing lens group comprising a fifth lens group having a positive refractive power and a sixth lens group having a negative refractive power and a focal length of f6, and wherein when said lens system changes from said wide angle setting to said telephoto setting, said first lens group and said fourth lens group move toward said object side such that a distance between said first lens group and said second lens group increases, a distance between said second lens group and said third lens group changes, a distance between said third lens group and said fourth lens group decreases monotonically, a distance between said fourth lens group and said image composing lens group changes, and a distance between said fifth lens group and said sixth lens group changes, and wherein $1.9 \leq |f6|/fW \leq 2.6$.

15. The high-magnification zoom lens of claim 14, wherein said fourth lens group has a focal length of f4, and said image composing lens group in said wide angle setting has a focal length of fR, and wherein $0.30 \leq f4/fR \leq 0.85$.

16. The high-magnification zoom lens of claim 14, wherein said lens system in said wide angle setting has a focal length of fW, said lens system in said telephoto setting has a focal length of fT, said first lens group has a focal length of f1, a combined focal length of said second lens group and said third lens group in said wide angle setting is f23, and wherein $1.1 \leq f1/(fW*fT)^{1/2} 2.3$ and $0.18 \leq |f23|/(fW*fT)^{1/2} 0.32$.

17. A high-magnification zoom lens having a lens system movable along an optical axis from a wide angle setting to a telephoto setting, said lens system having a focal length of fW in said wide angle setting and having a focal length of fT in said telephoto setting, said lens system comprising four lens groups arranged in order from an object side including:

a first lens group having a positive refractive power and a focal length of f1;

a second lens group having a negative refractive power and a focal length of f2;

a third lens group having a negative refractive power and a focal length of f3; and a fourth lens group having a positive refractive power;

wherein when said lens system changes from said wide angle setting to said telephoto setting, said first lens group and said fourth lens group move toward said object side such that a distance between said first lens group and said second lens group increases, a distance between said second lens group and said third lens group changes, and a distance between said third lens group and said fourth lens group decreases monotonically, and wherein $1.1 \leq f1/(fW*fT)^{1/2} \leq 2.3$ and $0.35 \leq f2/f3 \leq 0.75$.

18. The high-magnification zoom lens of claim 17, wherein said lens system in said wide angle setting has a focal length of fW, a distance between said second lens group and said third lens group along said optical axis at said wide angle setting is DW23, and a distance between said second lens group and said third lens group along said optical axis in said telephoto setting is DT23, and wherein $0.01 \leq (DT23-DW23)/fW \leq 0.12$.

19. The high-magnification zoom lens of claim 17, wherein a combined focal length of said second lens group G2 and said third lens group G3 at said wide angle setting is f23, and wherein $0.18 \leq |f23|/(fW*fT)^{1/2} \leq 0.32$.

20. A high-magnification zoom lens having a lens system movable along an optical axis from a wide angle setting to a telephoto setting, said lens system in said wide angle setting having a focal length of fW, said lens system in said telephoto setting having a focal length of fT, said lens system comprising four lens groups arranged in order from an object side including:

a first lens group having a positive refractive power and a focal length of f1;

a second lens group having a negative refractive power;

a third lens group having a negative refractive power, wherein a distance between said second lens group and said third lens group along said optical axis in said wide angle setting is DW23, and a distance between said second lens group and said third lens group along said optical axis in said telephoto setting is DT23; and a fourth lens group having a positive refractive power;

wherein when said lens system changes from said wide angle setting to said telephoto setting, a distance between said first lens group and said second lens group increases, a distance between said second lens group and said third lens group changes, and a distance between said third lens group and said fourth lens group decreases monotonically, and wherein $1.1 \leq f1/(fW*fT)^{1/2} \leq 2.3$ and $0.01 \leq (DT23-DW23)/fW \leq 0.12$.

21. The high-magnification zoom lens of claim 20, wherein said second lens group has a focal length of f2 and said third lens group has a focal length of f3, and wherein $0.35 \leq f2/f3 \leq 0.75$ 22. The high-magnification zoom lens of claim 20, wherein said first lens group and said fourth lens group move toward said object side when said lens system changes from said wide angle setting to said telephoto setting.

23. The high-magnification zoom lens of claim 22, wherein said second lens group has a focal length of f2 and said third lens group has a focal length of f3, and wherein $0.35 \leq f2/f3 \leq 0.75$.

24. The high-magnification zoom lens of claim 20, wherein a combined focal length of said second lens group and said third lens group in said wide angle setting is f23, and wherein $0.18 \leq |f23|/(fW*fT)^{1/2} \leq 0.32$.

25. A high-magnification zoom lens having a lens system movable along an optical axis from a wide angle setting to a telephoto setting, said lens system having a focal length of fW in said wide angle setting and a focal length of fT in said telephoto setting, said lens system, in the order from an object side, comprising:

a first lens group having a positive refractive power and focal length of f1;

a second lens group having a negative refractive power and focal length of f2;

a third lens group having a negative refractive power and focal length of f3;

a fourth lens group having a positive refractive power;

an image composing lens group having a positive refractive power, wherein when said lens system changes from said wide angle setting to said telephoto setting, a distance between said first lens group and said second lens group increases, a distance between said second lens group and said third lens group changes, a distance between said third lens group and said fourth lens group decreases monotonically, and a distance between said fourth lens group and said image composing lens group changes, and wherein $1.1 \leq f1/(fW*fT)^{1/2} \leq 2.3$ and $0.35 \leq f2/f3 \leq 0.75$.

26. The high magnification zoom lens of claim 25, wherein said fourth lens group has a focal length of f4, and wherein $0.30 \leq f4/fR \leq 0.85$.

27. The high magnification zoom lens of claim 25, wherein said first lens group and said fourth lens group move toward said object side when said lens system changes from said wide angle setting to said telephoto setting.

28. A high-magnification zoom lens having a lens system movable along an optical axis from a wide angle setting to a telephoto setting, said lens system having a focal length of fW in said wide angle setting and a focal length of fT in said telephoto setting, said lens system, in the order from an object side, comprising:

a first lens group having a positive refractive power and focal length of f1;

a second lens group having a negative refractive power;

a third lens group having a negative refractive power, wherein a distance between said second lens group and said third lens group along said optical axis in said wide angle setting as DW23, and distance between said second lens group and said third lens group along said optical axis in said telephoto setting is DT23;

a fourth lens group having a positive refractive power;

an image composing lens group having a positive refractive power, wherein when said lens system changes from said wide angle setting to said telephoto setting, a distance between said first lens group and said second lens group increases, a distance between said second lens group and said third lens group changes, a distance between said third lens group and said fourth lens group decreases monotonically, and a distance between said fourth lens group and said image composing lens group changes, and wherein $1.1 \leq f1/(fW*fT)^{1/2} \leq 2.3$ and $0.01 \leq (DT23-DW23)/fW \leq 0.12$.

29. The high magnification zoom lens of claim 28, wherein said second lens group has a focal length f2, said third lens group has a focal length f3, and wherein $0.35 \leq f2/f3 \leq 0.75$.

30. The high magnification zoom lens of claim 28, wherein said first lens group and said fourth lens group move toward said object size when said lens system changes from said wide angle setting to said telephoto setting.

* * * * *